United States Patent
Xiao et al.

(10) Patent No.: US 12,078,502 B2
(45) Date of Patent: Sep. 3, 2024

(54) NAVIGATION METHOD, NAVIGATION APPARATUS, DEVICE AND STORAGE MEDIUM

(71) Applicant: BEIJING BAIDU NETCOM SCIENCE TECHNOLOGY CO., LTD., Beijing (CN)

(72) Inventors: Ling Xiao, Beijing (CN); Huaibo Mei, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 35 days.

(21) Appl. No.: 17/727,366

(22) Filed: Apr. 22, 2022

(65) Prior Publication Data
US 2022/0276068 A1    Sep. 1, 2022

(30) Foreign Application Priority Data
Sep. 30, 2021    (CN) .......................... 202111159920.4

(51) Int. Cl.
*G01C 21/36*    (2006.01)
(52) U.S. Cl.
CPC ..... *G01C 21/3647* (2013.01); *G01C 21/3629* (2013.01)
(58) Field of Classification Search
None
See application file for complete search history.

(56) References Cited

U.S. PATENT DOCUMENTS

| 10,871,377 | B1* | 12/2020 | Yu .......................... G06V 20/20 |
| 2007/0192020 | A1* | 8/2007 | Brulle-Drews .... G01C 21/3647 |
| | | | 701/532 |
| 2014/0057657 | A1 | 2/2014 | Manber et al. |
| 2015/0185039 | A1* | 7/2015 | Milicic .............. G01C 21/3658 |
| | | | 701/437 |
| 2019/0179331 | A1 | 6/2019 | Heo et al. |

(Continued)

FOREIGN PATENT DOCUMENTS

| CN | 102788588 A | 11/2012 |
| CN | 102798397 A | 11/2012 |

(Continued)

OTHER PUBLICATIONS

Chinese Application No. 202111159920.4 First Office Action dated Jun. 28, 2022, 9 pages.

(Continued)

*Primary Examiner* — Peter D Nolan
*Assistant Examiner* — Michael F Whalen
(74) *Attorney, Agent, or Firm* — Cozen O'Connor (57) ABSTRACT

A navigation method and a navigation apparatus are provided. The method includes: generating a navigation route based on a navigation start-point position and a navigation end-point position; acquiring a navigation scenario of a terminal device in a process of performing a navigation based on the navigation route; acquiring, in response to determining that the navigation scenario is a preset target navigation scenario, special effect data of a virtual navigator matching the target navigation scenario; and presenting the special effect data of the virtual navigator through the terminal device.

20 Claims, 4 Drawing Sheets (56) References Cited

U.S. PATENT DOCUMENTS

2020/0232809 A1    7/2020   Rogan et al.
2021/0092555 A1*   3/2021   Mayor ................. G06V 10/806

FOREIGN PATENT DOCUMENTS

| CN | 111595346 | A | | 8/2020 | | |
|---|---|---|---|---|---|---|
| CN | 112146649 | A | | 12/2020 | | |
| CN | 113359986 | A | | 9/2021 | | |
| EP | 3156767 | A2 | * | 4/2017 | ......... | G01C 21/3492 |
| EP | 3923247 | A1 | * | 12/2021 | ............. | G01C 21/00 |
| KR | 20080053133 | A | | 6/2008 | | |

OTHER PUBLICATIONS

English Translation of Chinese Application No. 202111159920.4 First Office Action dated Jun. 28, 2022, 10 pages.

\* cited by examiner

NAVIGATION METHOD, NAVIGATION APPARATUS, DEVICE AND STORAGE MEDIUM

CROSS-REFERENCE TO RELATED APPLICATIONS

This patent application claims the priority of Chinese Patent Application No. 202111159920.4, filed on Sep. 30, 2021, and entitled "Navigation Method, Navigation Apparatus, Device and Storage Medium", the entire content of which is herein incorporated by reference.

TECHNICAL FIELD

The present disclosure relates to the field of artificial intelligence technology, specifically to intelligent transportation and deep learning technologies, and particularly to a navigation method, a navigation apparatus, a device and a storage medium, applicable to map navigation scenarios.

BACKGROUND

A current navigation scheme is generally to perform a voice broadcast at a preset maneuver point, and the timing of the broadcast is heavily dependent on a satellite signal. The above method has shortcomings such as not being intuitive and providing limited navigation information, resulting in a low navigation efficiency.

SUMMARY

The present disclosure provides a navigation method, a navigation apparatus, a device and a storage medium.

According to a first aspect of the present disclosure, a navigation method is provided. The method includes: generating a navigation route based on a navigation start-point position and a navigation end-point position; acquiring a navigation scenario of a terminal device in a process of performing a navigation based on the navigation route; acquiring, in response to determining that the navigation scenario is a preset target navigation scenario, special effect data of a virtual navigator matching the target navigation scenario; and presenting the special effect data of the virtual navigator through the terminal device.

According to a second aspect of the present disclosure, a navigation apparatus is provided. The navigation apparatus includes: a generating module, configured to generate a navigation route based on a navigation start-point position and a navigation end-point position; a first acquiring module, configured to acquire a navigation scenario of a terminal device in a process of performing a navigation based on the navigation route; a second acquiring module, configured to acquire, in response to determining that the navigation scenario is a preset target navigation scenario, special effect data of a virtual navigator matching the target navigation scenario; and a first presenting module, configured to present the special effect data of the virtual navigator through the terminal device.

According to a third aspect of the present disclosure, an electronic device is provided. The electronic device includes at least one processor; and a memory, communicatively connected to the at least one processor. The memory stores an instruction executable by the at least one processor, and the instruction is executed by the at least one processor, to enable the at least one processor to perform the method according to any implementation in the first aspect.

According to a fourth aspect of the present disclosure, a non-transitory computer readable storage medium storing a computer instruction is provided. The computer instruction is used to cause a computer to perform the method according to any implementation in the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
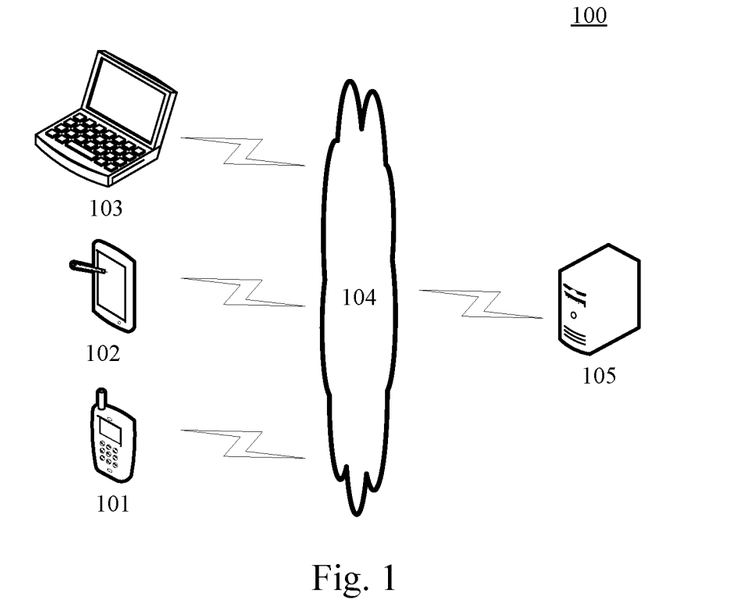
FIG. 1 is a diagram of an exemplary system architecture in which embodiments of the present disclosure may be applied.

FIG. 1 illustrates an exemplary system architecture 100 in which a navigation method or a navigation apparatus according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various client applications may be installed on the terminal devices 101, 102 and 103.

The terminal devices 101, 102 and 103 may be hardware or software. As hardware, the terminal devices 101, 102 and 103 may be various electronic devices, the electronic devices including, but is not limited to, a smartphone, a tablet computer, a laptop portable computer, a desktop computer, and the like. As software, the terminal devices 101, 102 and 103 may be installed in the above listed electronic devices. The terminal devices 101, 102 and 103 may be implemented as a plurality of pieces of software or a plurality of software modules, or may be implemented as a single piece of software or a single software module, which will not be specifically limited here.

The server 105 may provide various services. For example, the server 105 may analyze and process a navigation start-point position and navigation end-point position acquired from the terminal devices 101, 102 and 103, and generate a processing result (e.g., a navigation route).

It should be noted that the server 105 may be hardware or software. As hardware, the server 105 may be implemented as a distributed server cluster composed of a plurality of servers, or may be implemented as a single server. As software, the server 105 may be implemented as a plurality of pieces of software or a plurality of software modules (e.g., software or software modules for providing a distributed service), or may be implemented as a single piece of software or a single software module, which will not be specifically limited here.

It should be noted that the navigation method provided in the embodiments of the present disclosure is generally performed by the server 105. Correspondingly, the navigation apparatus is generally provided in the server 105.

It should be appreciated that the numbers of the terminal devices, the networks and the servers in FIG. 1 are merely illustrative. Any number of terminal devices, networks and servers may be provided based on actual requirements.

Figure 2:
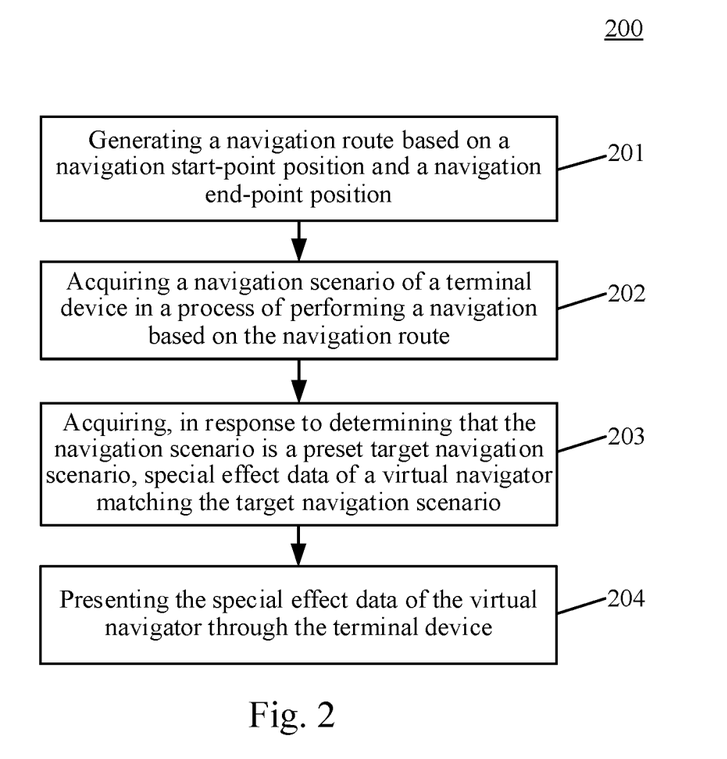
FIG. 2 is a flowchart of a navigation method according to an embodiment of the present disclosure.

FIG. 2 illustrates a flow 200 of a navigation method according to of an embodiment the present disclosure. The navigation method includes the following steps.

Step 201, generating a navigation route based on a navigation start-point position and a navigation end-point position.

In this embodiment, an executing body (e.g., the server 105 in FIG. 1) of the navigation method may generate the navigation route based on the navigation start-point position and the navigation end-point position. First, the executing body acquires the navigation start-point position and the navigation end-point position. Here, the navigation start-point position may be a current position point where a terminal device is. The executing body acquires the current position point of the terminal device and uses the current position point as the start-point position of the navigation route. The navigation start-point position may alternatively be a starting position point inputted by a user and received through the terminal device. The navigation end-point position may be an end-point position point inputted by the user and received through the terminal device.

Then, the executing body generates the navigation route based on the acquired navigation start-point position and the acquired navigation end-point position. The specific method of generating the navigation route may be implemented by using an existing technology, which will not be repeatedly described here.

Step 202, acquiring a navigation scenario of a terminal device in a process of performing a navigation based on the navigation route.

In this embodiment, the executing body may acquire the navigation scenario of the terminal device in the process of performing the navigation based on the navigation route. After generating the navigation route in step 201, the executing body sends the navigation route to the terminal device, to cause the terminal device to present the above navigation route and perform the navigation based on the above navigation route.

Then, the executing body acquires the navigation scenario of the terminal device in the process of performing the navigation based on the navigation route. For example, the executing body acquires real-time position information collected by a GPS (Global Positioning System) module in the terminal device in real time, and makes the real-time position information correspond to the navigation route (i.e., displays the real-time position information at the corresponding position in the navigation route), thus determining the navigation scenario of the terminal device, that is, determining the navigation status of the terminal device during the navigation, for example, the beginning of the navigation and the ending of the navigation.

Step 203, acquiring, in response to determining that the navigation scenario is a preset target navigation scenario, special effect data of a virtual navigator matching the target navigation scenario.

In this embodiment, in the situation where it is determined that the navigation scenario is the preset target navigation scenario, the executing body may acquire the special effect data of the virtual navigator matching the target navigation scenario. In this embodiment, the target navigation scenario is set in advance according to an actual situation. The target navigation scenario is a navigation scenario often occurring during the navigation, for example, a navigation beginning scenario, a navigation ending scenario and a turning scenario. Moreover, the corresponding special effect data of the virtual navigator is set in advance for each target navigation scenario. Here, the virtual navigator is a preset virtual image, which guides a user to advance in a navigation route. The special effect data may refer to a special effect animation or voice information. In the situation where it is determined that the navigation scenario is the preset target navigation scenario, the executing body acquires the special effect data of the virtual navigator corresponding to the target navigation scenario.

As an example, it is assumed that, in the situation where it is determined that the navigation scenario is a preset navigation beginning scenario, the executing body acquires the entrance animation of the virtual navigator that matches the navigation beginning scenario. Alternatively, the special effect data in this scenario may further include voice prompt data: "please follow me to start off."

As another example, it is assumed that, in the situation where it is determined that the navigation scenario is a preset navigation ending scenario, the executing body acquires the exit animation of the virtual navigator that matches the navigation ending scenario. Alternatively, the special effect data in this scenario may further include voice prompt data: "you have reached your destination, the navigation is over, and thank you for your use."

Step 204, presenting the special effect data of the virtual navigator through the terminal device.

In this embodiment, the executing body may present, through the terminal device, the special effect data of the virtual navigator that is acquired in step 203, thereby more intuitively and visually present the navigation route and the navigation status. For example, at the beginning of the navigation, the entrance animation of the virtual navigator is presented at the start point of the navigation route. At the ending of the navigation, the exit animation of the virtual navigator is presented at the end point of the navigation route. In the process of advancing along the navigation route, by acquiring the real-time position information of the terminal device, the special effect data of the virtual navigator is presented at the corresponding position of the navigation route.

According to the navigation method provided in the embodiment of the present disclosure, the navigation route is first generated based on the navigation start-point position and the navigation end-point position. Then, the navigation scenario of the terminal device in the process of performing the navigation based on the navigation route is acquired. Next, in response to determining that the navigation scenario is the preset target navigation scenario, the special effect data of the virtual navigator that matches the target navigation scenario is acquired. Finally, the special effect data of the virtual navigator is presented through the terminal device. According to the navigation method in the present disclosure, in which the virtual navigator guides the user to advance along the navigation route on the terminal device, such that the user only needs to follow the virtual navigator to advance, without identifying a navigation direction and a navigation position, thereby improving the visibility, efficiency and accuracy of the navigation.

In the technical solution of the present disclosure, the collection, storage, use, processing, transmission, provision, disclosure, etc. of the personal information of a user all comply with the provisions of the relevant laws and regulations, and do not violate public order and good customs.

Figure 3:
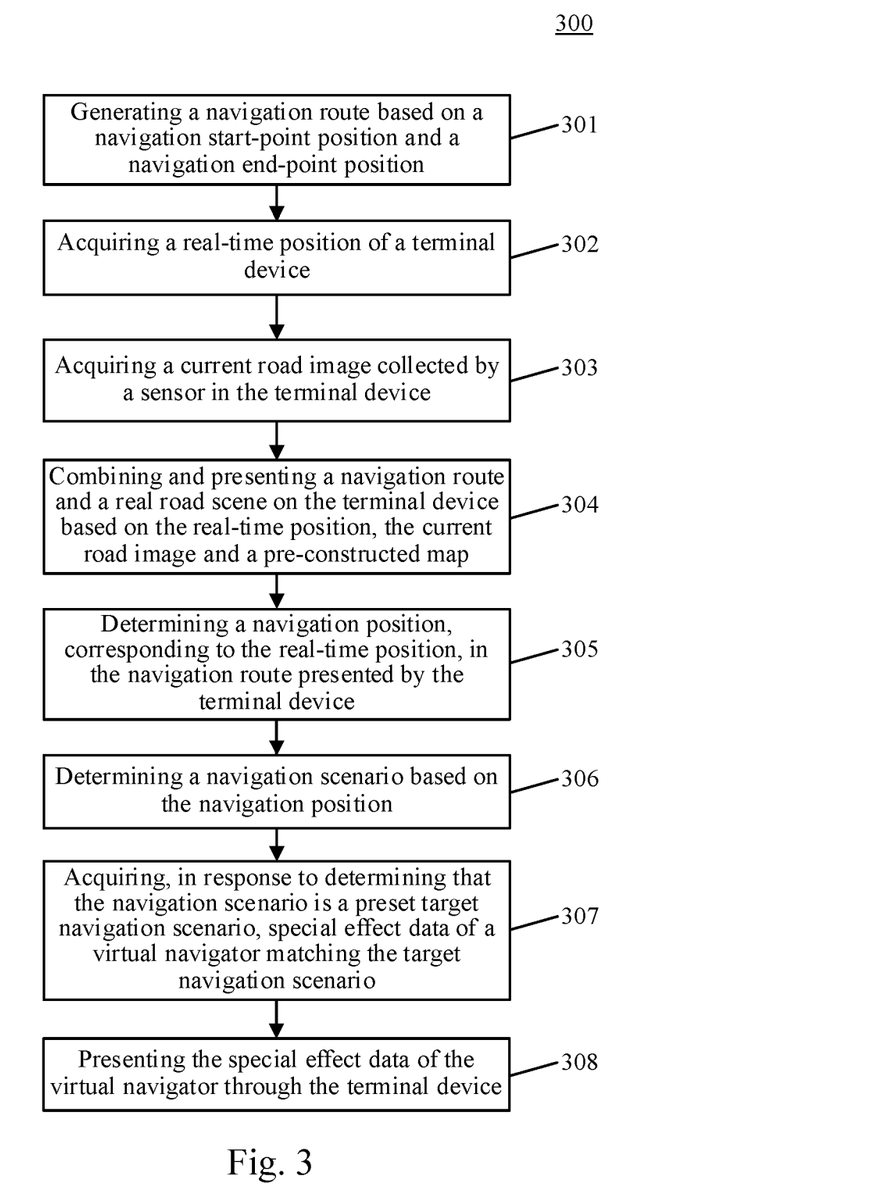
FIG. 3 is a flowchart of the navigation method according to another embodiment of the present disclosure.

FIG. 3 illustrates a flow 300 of the navigation method according to another embodiment of the present disclosure. The navigation method includes the following steps.

Step 301, generating a navigation route based on a navigation start-point position and a navigation end-point position.

Step 301 is substantially consistent with step 201 in the foregoing embodiment. For the specific implementation, reference may be made to the foregoing description for step 201, and thus the specific implementation will not be repeated here.

Step 302, acquiring a real-time position of a terminal device.

In this embodiment, an executing body (e.g., the server 105 in FIG. 1) of the navigation method may acquire the real-time position of the terminal device, for example, may determine the real-time position of the terminal device by acquiring real-time position information collected by a GPS module built in the terminal device, or may acquire the real-time position of the terminal device by other means, which is not specifically limited in this embodiment.

Step 303, acquiring a current road image collected by a sensor in the terminal device.

In this embodiment, the executing body further acquires the current road image collected by the sensor built in the terminal device. The sensor built in the terminal device collects the current road image in real time, and the executing body acquires the current road image collected by the sensor in the terminal device in real time.

Step 304, combining and presenting a navigation route and a real road scene on the terminal device based on the real-time position, the current road image and a pre-constructed map.

In this embodiment, the executing body may combine and present the navigation route and the real road scene on the terminal device based on the real-time position acquired in step 302, the current road image acquired in step 303 and the pre-constructed map. For example, matching is performed on the real-time position and a point in the pre-constructed map, so as to determine the position point corresponding to the real-time position in the map. Then, a direction is identified based on the current road image, and accordingly, a route (i.e., a navigation route) to be traveled and the real scene are combined and then tiled and displayed on the terminal device. Therefore, it is implemented that the navigation route and the real road scene are combined and presented on the terminal device, thereby providing more intuitive and visual navigation information for the user.

Step 305, determining a navigation position, corresponding to the real-time position, in the navigation route presented by the terminal device.

In this embodiment, the executing body determines the navigation position, corresponding to the real-time position of the terminal device, in the navigation route presented by the terminal device. That is, the executing body performs matching on the real-time position of the terminal device and a position point in the pre-constructed map, so as to determine the navigation position, corresponding to the real-time position of the terminal device, in the navigation route presented by the terminal device.

Step 306, determining a navigation scenario based on the navigation position.

In this embodiment, the executing body may determine the navigation scenario based on the navigation position determined in step 305. For example, assuming that the determined navigation position is the start position point of the navigation route, it may be determined that the navigation scenario is a navigation beginning scenario. Assuming that the determined navigation position is the end-point position point of the navigation route, it may be determined that the navigation scenario is a navigation ending scenario. By determining the navigation scenario based on the above steps, the real-time characteristic and accuracy of the navigation scenario can be ensured.

Step 307, acquiring, in response to determining that the navigation scenario is a preset target navigation scenario, special effect data of a virtual navigator matching the target navigation scenario.

In this embodiment, in the situation where it is determined that the navigation scenario is the preset target navigation scenario, the executing body may acquire the special effect data of the virtual navigator matching the target navigation scenario. Step 307 is substantially consistent with step 203 in the foregoing embodiment. For the specific implementation, reference may be made to the foregoing description of step 203, and thus the specific implementation will not be repeated here.

In some alternative implementations of this embodiment, the target navigation scenario includes, but is not limited to, at least one of: the navigation beginning scenario, a straight travel scenario, a scenario of reaching a turning point position in the navigation route, a scenario of reaching a preset facility in the navigation route, or the navigation ending scenario.

Specifically, the navigation beginning scenario is a scenario in which a navigation performed for the user begins based on the navigation route. As an example, in response to the user triggering a navigation beginning event, it may be determined that the terminal device is in the navigation beginning scenario. As another example, in response to detecting that the position of the terminal device is the start position of the navigation route, it may also be determined that the terminal device is in the navigation beginning scenario.

The straight travel scenario is a scenario in which the user keeps a straight travel based on the navigation route.

The scenario of reaching the turning point position in the navigation route is a scenario in which the user reaches the turning point position in the navigation route. For example, based on the current position of the terminal device and the position of a turning point included in the generated navigation route, whether the distance difference between the current position and the turning point position is less than a preset distance difference threshold may be determined. If the distance difference is less than the preset distance difference threshold, it may be determined that the terminal device is in the scenario of reaching the turning point position in the navigation route.

The scenario of reaching the preset facility in the navigation route is a scenario in which the user reaches the preset facility in the navigation route. Here, the preset facility may be an overpass, a slope, an elevator, an escalator, or the like.

The navigation ending scenario is a scenario in which the user reaches the end point of the navigation route.

In some alternative implementations of this embodiment, step 307 includes, but is not limited to, at least one of: acquiring, in response to the navigation scenario being the navigation beginning scenario, an entrance animation of the virtual navigator; acquiring, in response to the navigation scenario being the straight travel scenario, a forward travel animation of the virtual navigator; acquiring, in response to the navigation scenario being the scenario of reaching the turning point position in the navigation route, a turning point guidance animation of the virtual navigator; acquiring, in response to the navigation scenario being the scenario of reaching the preset facility in the navigation route, a facility guidance animation of the virtual navigator; or acquiring, in response to the navigation scenario being the navigation ending scenario, an exit animation of the virtual navigator.

In this implementation, corresponding special effect data is already preset for each target navigation scenario. Therefore, when determining that the navigation scenario is the preset target navigation scenario, the executing body acquires the special effect data of the virtual navigator that matches the target navigation scenario.

When the navigation scenario is the navigation beginning scenario, the entrance animation of the virtual navigator is acquired, and the voice prompt data "please follow me to start off" may further be included.

When it is determined that the navigation scenario being the straight travel scenario, the forward travel animation of the virtual navigator is acquired. At this time, the virtual navigator may walk on the navigation route, and the action may be a flying or jumping posture. The voice prompt data "please keep a straight travel" may further be included.

When it is determined that the navigation scenario is the scenario of reaching the turning point position in the navigation route, the turning point guidance animation of the virtual navigator is acquired.

When it is determined that the navigation scenario is the scenario of reaching the preset facility in the navigation route, the facility guidance animation of the virtual navigator is acquired.

When it is determined that the navigation scenario is the navigation ending scenario, the exit animation of the virtual navigator is acquired. Meanwhile, the voice prompt data "you have reached your destination, the navigation is over, and thank you for your use" may further be included.

By acquiring the special effect data of the virtual navigator that matches the target navigation scenario and presenting the special effect data through the terminal device, more abundant and intuitive navigation information can be provided for the user, thus improving the navigation efficiency.

Step 308, presenting the special effect data of the virtual navigator through the terminal device.

Step 308 is substantially consistent with step 204 in the foregoing embodiment. For the specific implementation, reference may be made to the foregoing description for step 204, and thus the specific implementation will not be repeated here.

It can be seen from FIG. 3 that, as compared with the embodiment corresponding to FIG. 2, in the navigation method in this embodiment, the navigation route is first generated based on the navigation start-point position and the navigation end-point position; the real-time position of the terminal device is acquired, the current road image collected by the sensor in the terminal device is acquired, and then, the navigation route and the real road scene are combined and presented on the terminal device based on the real-time position, the current road image and the pre-constructed map; thereafter, the navigation position, corresponding to the real-time position, in the navigation route presented by the terminal device is determined; and finally, the navigation scenario is determined based on the navigation position, the special effect data of the virtual navigator matching the target navigation scenario is acquired in response to determining that the navigation scenario is the preset target navigation scenario, and the special effect data of the virtual navigator is presented through the terminal device. According to the navigation method in this embodiment, by acquiring the special effect data of the virtual navigator that matches the target navigation scenario and presenting the special effect data through the terminal device, more abundant and intuitive navigation information can be provided for the user, thus improving the navigation efficiency.

Figure 4:
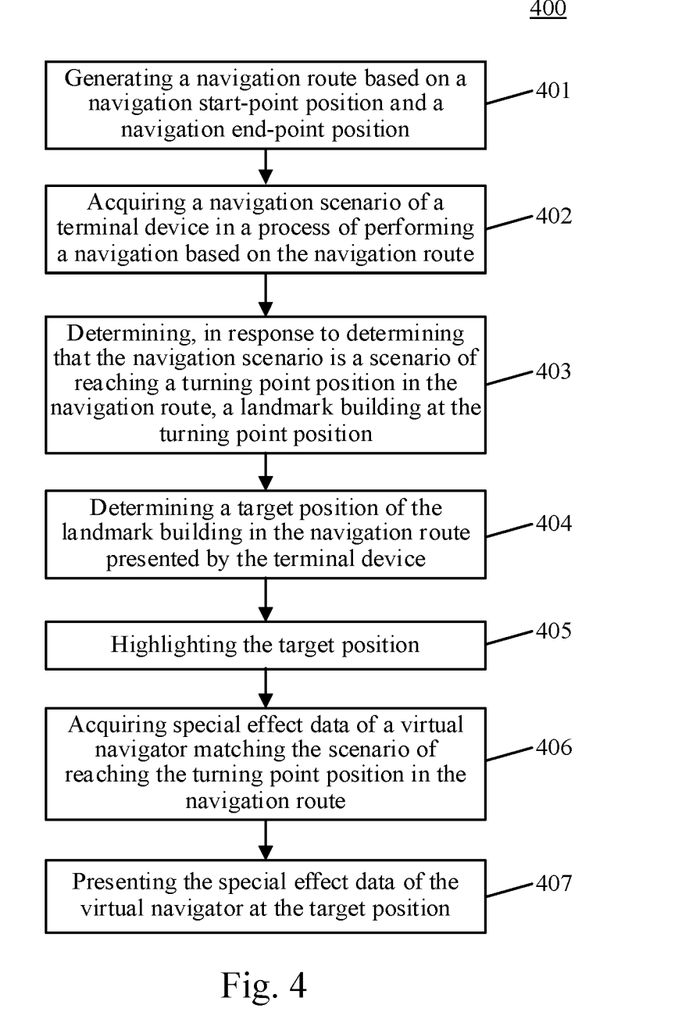
FIG. 4 is a flowchart of the navigation method according to another embodiment of the present disclosure.

FIG. 4 illustrates a flow 400 of the navigation method according to another embodiment of the present disclosure. The navigation method includes the following steps.

Step 401, generating a navigation route based on a navigation start-point position and a navigation end-point position.

Step 402, acquiring a navigation scenario of a terminal device in a process of performing a navigation based on the navigation route.

Steps 401-402 are substantially consistent with steps 201-202 in the foregoing embodiment. For the specific implementations, reference may be made to the foregoing descriptions for steps 201-202, and thus the specific implementations will not be repeated here.

Step 403, determining, in response to determining that the navigation scenario is a scenario of reaching a turning point position in the navigation route, a landmark building at the turning point position.

In this embodiment, in the situation where it is determined that the navigation scenario is the scenario of reaching the turning point position in the navigation route, an executing body (e.g., the server 105 in FIG. 1) of the navigation method may acquire the landmark building at the turning point position from a pre-constructed map, and use the landmark building as a landmark at the turning point position. Here, the pre-constructed map is marked with a plurality of landmark buildings. For example, when it is determined that the navigation scenario is the scenario of reaching the turning point position in the navigation route, if the executing body acquires, from the pre-constructed map, that there is a "KFC" at a turning point position, the executing body uses the "KFC" as landmark building at the turning point position.

Step 404, determining a target position of the landmark building in the navigation route presented by the terminal device.

In this embodiment, after determining the landmark building at the turning point position, the executing body determines the position of the above landmark building in the navigation route presented by the terminal device, and marks the position as the target position.

Step 405, highlighting the target position.

In this embodiment, the executing body highlights the target position determined in step 404. For example, assuming that the landmark building is the "KFC," the executing body determines the target position of the "KFC" in the navigation route presented by the terminal device, and highlights the target position.

Step 406, acquiring special effect data of a virtual navigator matching the scenario of reaching the turning point position in the navigation route.

In this embodiment, since it is already determined that the target navigation scenario is the scenario of reaching the turning point position in the navigation route, the executing body acquires the special effect data of the virtual navigator that matches the scenario of reaching the turning point position in the navigation route. The special effect data may includes a beckoning animation of the virtual navigator, and meanwhile, may further include the voice prompt information "turn left at KFC after 100 meters."

Step 407, presenting the special effect data of the virtual navigator at the target position.

In this embodiment, the specific effect data of the virtual navigator may be presented at the target position in the navigation route of the terminal device. For example, the beckoning animation of the virtual navigator is presented beside the "KFC" in the navigation route, and the voice prompt information is broadcasted.

It can be seen from FIG. 4 that, as compared with the embodiment corresponding to FIG. 3, the navigation method in this embodiment emphasizes the step of guiding the user to advance based on the landmark building at the turning point position. According to the navigation method, the broadcasting is performed at the landmark building at the turning point, such that the user only needs to remember the landmark building without viewing the detailed navigation route or listening to the detailed voice broadcast. In addition, the navigation method in this embodiment is not dependent on the satellite signal, and the direction is broadcasted through "left" and "right," which makes the broadcasted information more accurate, thereby improving the navigation efficiency.

Figure 5:
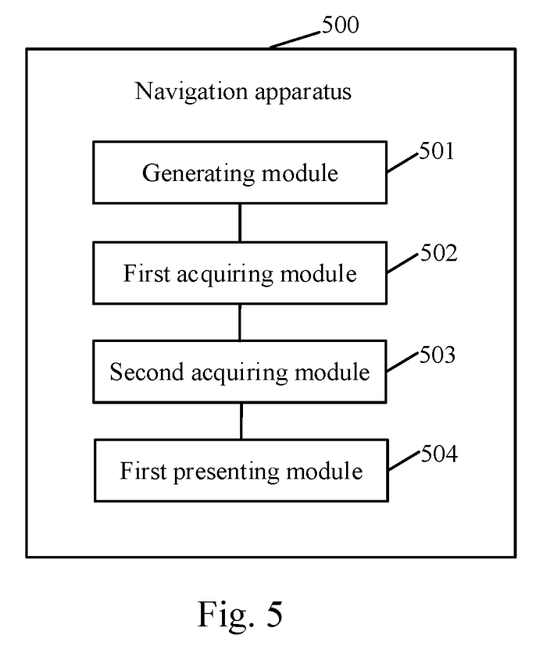
FIG. 5 is a schematic structural diagram of a navigation apparatus according to an embodiment of the present disclosure.

Further referring to FIG. 5, as an implementation of the method shown in the above drawing, an embodiment of the present disclosure provides a navigation apparatus. The embodiment of the apparatus corresponds to the embodiment of the method shown in FIG. 2. The apparatus may be applied in various electronic devices.

As shown in FIG. 5, a navigation apparatus 500 in this embodiment includes: a generating module 501, a first acquiring module 502, a second acquiring module 503 and a first presenting module 504. Here, the generating module 501 is configured to generate a navigation route based on a navigation start-point position and a navigation end-point position. The first acquiring module 502 is configured to acquire a navigation scenario of a terminal device in a process of performing a navigation based on the navigation route. The second acquiring module 503 is configured to acquire, in response to determining that the navigation scenario is a preset target navigation scenario, special effect data of a virtual navigator matching the target navigation scenario. The first presenting module 504 is configured to present the special effect data of the virtual navigator through the terminal device.

In this embodiment, for specific processes of the generating module 501, the first acquiring module 502, the second acquiring module 503 and the first presenting module 504 in the navigation apparatus 500, and their technical effects, reference may be respectively made to relative descriptions of steps 201-204 in the corresponding embodiment of FIG. 2, and thus the specific processes and the technical effects will not be repeated here.

In some alternative implementations of this embodiment, the navigation apparatus 500 further includes: a third acquiring module, configured to acquire a real-time position of the terminal device; a fourth acquiring module, configured to acquire a current road image collected by a sensor in the terminal device; and a second presenting module, configured to combine and present the navigation route and a real road scene on the terminal device based on the real-time position, the current road image and a pre-constructed map.

In some alternative implementations of this embodiment, the first acquiring module includes: a first determining submodule, configured to determine a navigation position, corresponding to the real-time position, in the navigation route presented by the terminal device; and a second determining submodule, configured to determine the navigation scenario based on the navigation position.

In some alternative implementations of this embodiment, the target navigation scenario includes at least one of: a navigation beginning scenario, a straight travel scenario, a scenario of reaching a turning point position in the navigation route, a scenario of reaching a preset facility in the navigation route, or a navigation ending scenario.

In some alternative implementations of this embodiment, in a situation where the target navigation scenario is the scenario of reaching the turning point position in the navigation route, the navigation apparatus 500 further includes: a first determining module, configured to determine a landmark building at the turning point position; a second determining module, configured to determine a target position of the landmark building in the navigation route presented by the terminal device; and a displaying module, configured to highlight the target position. The first presenting module includes: a presenting submodule, configured to present the special effect data of the virtual navigator at the target position.

In some alternative implementations of this embodiment, the second acquiring module includes at least one of: a first acquiring submodule, configured to acquire, in response to the navigation scenario being the navigation beginning scenario, an entrance animation of the virtual navigator; a second acquiring submodule, configured to acquire, in response to the navigation scenario being the straight travel scenario, a forward travel animation of the virtual navigator; a third acquiring submodule, configured to acquire, in response to the navigation scenario being the scenario of reaching the turning point position in the navigation route, a turning point guidance animation of the virtual navigator; a fourth acquiring submodule, configured to acquire, in response to the navigation scenario being the scenario of reaching the preset facility in the navigation route, a facility guidance animation of the virtual navigator; or a fifth acquiring submodule, configured to acquire, in response to the navigation scenario being the navigation ending scenario, an exit animation of the virtual navigator.

According to an embodiment of the present disclosure, the present disclosure further provides an electronic device, a readable storage medium and a computer program product.

Figure 6:
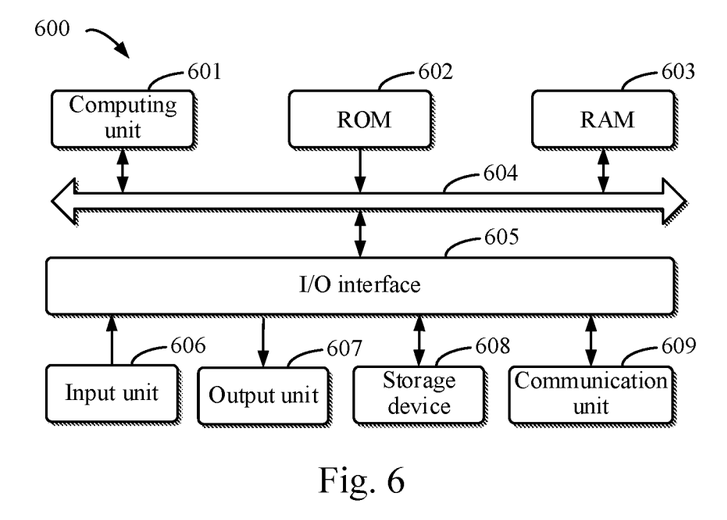
FIG. 6 is a block diagram of an electronic device used to implement the navigation method according to embodiments of the present disclosure.

FIG. 6 is a schematic block diagram of an example electronic device 600 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device 600 includes a computation unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computation unit 601, the ROM 602 and the RAM 603 are connected to each other through a bus 604. An input/output (I/O) interface 606 is also connected to the bus 604.

The following components in the electronic device 600 are connected to the I/O interface 606: an input unit 606, for example, a keyboard and a mouse; an output unit 607, for example, various types of displays and a speaker; a storage device 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computation unit 601 may be various general-purpose and/or special-purpose processing assemblies having processing and computing capabilities. Some examples of the computation unit 601 include, but is not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 601 performs the various methods and processes described above, for example, the navigation method. For example, in some embodiments, the navigation method may be implemented as a computer software program, which is tangibly included in a machine readable medium, for example, the storage device 608. In some embodiments, part or all of the computer program may be loaded into and/or installed on the device 600 via the ROM 602 and/or the communication unit 609. When the computer program is loaded into the RAM 603 and executed by the computation unit 601, one or more steps of the navigation method may be performed. Alternatively, in other embodiments, the computation unit 601 may be configured to perform the navigation method through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A navigation method, comprising:
   generating a navigation route based on a navigation start-point position and a navigation end-point position;
   acquiring a navigation scenario of a terminal device in a process of performing a navigation based on the navigation route;
   acquiring, in response to determining that the navigation scenario is a preset target navigation scenario, special effect data of a virtual navigator matching the target navigation scenario; and
   presenting the special effect data of the virtual navigator through the terminal device;
   wherein the target navigation scenario comprises a scenario of reaching a preset facility in the navigation route, the preset facility comprising an overpass, a slope, an elevator, or an escalator; and
   acquiring, in response to determining that the navigation scenario is the preset target navigation scenario, special effect data of the virtual navigator matching the target navigation scenario comprises:
   acquiring, in response to the navigation scenario being the scenario of reaching the preset facility in the navigation route, a facility guidance animation of the virtual navigator, wherein the virtual navigator is a preset virtual image capable of performing a body movement to guide a user to advance in the navigation route.

2. The method according to claim 1, further comprising:
   acquiring a real-time position of the terminal device;
   acquiring a current road image collected by a sensor in the terminal device; and
   combining and presenting the navigation route and a real road scene on the terminal device based on the real-time position, the current road image and a pre-constructed map.

3. The method according to claim 2, wherein acquiring the navigation scenario of the terminal device in the process of performing the navigation based on the navigation route comprises:
   determining a navigation position, corresponding to the real-time position, in the navigation route presented by the terminal device; and
   determining the navigation scenario based on the navigation position.

4. The method according to claim 2, wherein the target navigation scenario further comprises at least one of: a navigation beginning scenario, a straight travel scenario, a scenario of reaching a turning point position in the navigation route, or a navigation ending scenario.

5. The method according to claim 1, wherein the target navigation scenario further comprises at least one of: a navigation beginning scenario, a straight travel scenario, a scenario of reaching a turning point position in the navigation route, or a navigation ending scenario.

6. The method according to claim 5, wherein, in a situation where the target navigation scenario is the scenario of reaching the turning point position in the navigation route, the method further comprises:
   determining a landmark building at the turning point position;
   determining a target position of the landmark building in the navigation route presented by the terminal device; and
   highlighting the target position, and
   wherein presenting the special effect data of the virtual navigator through the terminal device comprises:
   presenting the special effect data of the virtual navigator at the target position.

7. The method according to claim 5, wherein acquiring, in response to determining that the navigation scenario is the preset target navigation scenario, special effect data of the virtual navigator matching the target navigation scenario comprises at least one of:
   acquiring, in response to the navigation scenario being the navigation beginning scenario, an entrance animation of the virtual navigator;
   acquiring, in response to the navigation scenario being the straight travel scenario, a forward travel animation of the virtual navigator;
   acquiring, in response to the navigation scenario being the scenario of reaching the turning point position in the navigation route, a turning point guidance animation of the virtual navigator;
   or
   acquiring, in response to the navigation scenario being the navigation ending scenario, an exit animation of the virtual navigator.

8. An electronic device, comprising:
   at least one processor; and
   a memory, communicatively connected to the at least one processor,
   wherein the memory stores an instruction executable by the at least one processor, and the instruction is executed by the at least one processor, to enable the at least one processor to perform operations, the operations comprising:
  generating a navigation route based on a navigation start-point position and a navigation end-point position;
  acquiring a navigation scenario of a terminal device in a process of performing a navigation based on the navigation route;
  acquiring, in response to determining that the navigation scenario is a preset target navigation scenario, special effect data of a virtual navigator matching the target navigation scenario; and
  presenting the special effect data of the virtual navigator through the terminal device;
  wherein the target navigation scenario comprises a scenario of reaching a preset facility in the navigation route, the preset facility comprising an overpass, a slope, an elevator, or an escalator; and
  acquiring, in response to determining that the navigation scenario is the preset target navigation scenario, special effect data of the virtual navigator matching the target navigation scenario comprises:
  acquiring, in response to the navigation scenario being the scenario of reaching the preset facility in the navigation route, a facility guidance animation of the virtual navigator, wherein the virtual navigator is a preset virtual image capable of performing a body movement to guide a user to advance in the navigation route.

9. The electronic device according to claim 8, wherein the operations further comprise:
  acquiring a real-time position of the terminal device;
  acquiring a current road image collected by a sensor in the terminal device; and
  combining and presenting the navigation route and a real road scene on the terminal device based on the real-time position, the current road image and a pre-constructed map.

10. The electronic device according to claim 9, wherein acquiring the navigation scenario of the terminal device in the process of performing the navigation based on the navigation route comprises:
  determining a navigation position, corresponding to the real-time position, in the navigation route presented by the terminal device; and
  determining the navigation scenario based on the navigation position.

11. The electronic device according to claim 9, wherein the target navigation scenario further comprises at least one of: a navigation beginning scenario, a straight travel scenario, a scenario of reaching a turning point position in the navigation route, or a navigation ending scenario.

12. The electronic device according to claim 8, wherein the target navigation scenario further comprises at least one of: a navigation beginning scenario, a straight travel scenario, a scenario of reaching a turning point position in the navigation route, or a navigation ending scenario.

13. The electronic device according to claim 12, wherein, in a situation where the target navigation scenario is the scenario of reaching the turning point position in the navigation route, the electronic device further comprises:
  determining a landmark building at the turning point position;
  determining a target position of the landmark building in the navigation route presented by the terminal device; and
  highlighting the target position, and
  wherein presenting the special effect data of the virtual navigator through the terminal device comprises:
  presenting the special effect data of the virtual navigator at the target position.

14. The electronic device according to claim 12, wherein acquiring, in response to determining that the navigation scenario is the preset target navigation scenario, special effect data of the virtual navigator matching the target navigation scenario comprises at least one of:
  acquiring, in response to the navigation scenario being the navigation beginning scenario, an entrance animation of the virtual navigator;
  acquiring, in response to the navigation scenario being the straight travel scenario, a forward travel animation of the virtual navigator;
  acquiring, in response to the navigation scenario being the scenario of reaching the turning point position in the navigation route, a turning point guidance animation of the virtual navigator;
  or
  acquiring, in response to the navigation scenario being the navigation ending scenario, an exit animation of the virtual navigator.

15. A non-transitory computer readable storage medium, storing a computer instruction, wherein the computer instruction, when executed by a processor, causes the processor to perform operations, the operations comprising:
  generating a navigation route based on a navigation start-point position and a navigation end-point position;
  acquiring a navigation scenario of a terminal device in a process of performing a navigation based on the navigation route;
  acquiring, in response to determining that the navigation scenario is a preset target navigation scenario, special effect data of a virtual navigator matching the target navigation scenario; and
  presenting the special effect data of the virtual navigator through the terminal device;
  wherein the target navigation scenario comprises a scenario of reaching a preset facility in the navigation route, the preset facility comprising an overpass, a slope, an elevator, or an escalator; and
  acquiring, in response to determining that the navigation scenario is the preset target navigation scenario, special effect data of the virtual navigator matching the target navigation scenario comprises:
  acquiring, in response to the navigation scenario being the scenario of reaching the preset facility in the navigation route, a facility guidance animation of the virtual navigator, wherein the virtual navigator is a preset virtual image capable of performing a body movement to guide a user to advance in the navigation route.

16. The non-transitory computer readable storage medium according to claim 15, wherein the operations further comprise:
  acquiring a real-time position of the terminal device;
  acquiring a current road image collected by a sensor in the terminal device; and
  combining and presenting the navigation route and a real road scene on the terminal device based on the real-time position, the current road image and a pre-constructed map.

17. The non-transitory computer readable storage medium according to claim 16, wherein acquiring the navigation scenario of the terminal device in the process of performing the navigation based on the navigation route comprises:

determining a navigation position, corresponding to the real-time position, in the navigation route presented by the terminal device; and determining the navigation scenario based on the navigation position.

18. The non-transitory computer readable storage medium according to claim 15, wherein the target navigation scenario further comprises at least one of: a navigation beginning scenario, a straight travel scenario, a scenario of reaching a turning point position in the navigation route, or a navigation ending scenario.

19. The non-transitory computer readable storage medium according to claim 18, wherein, in a situation where the target navigation scenario is the scenario of reaching the turning point position in the navigation route, the non-transitory computer readable storage medium further comprises:

determining a landmark building at the turning point position;

determining a target position of the landmark building in the navigation route presented by the terminal device; and highlighting the target position, and wherein presenting the special effect data of the virtual navigator through the terminal device comprises:

presenting the special effect data of the virtual navigator at the target position.

20. The non-transitory computer readable storage medium according to claim 18, wherein acquiring, in response to determining that the navigation scenario is the preset target navigation scenario, special effect data of the virtual navigator matching the target navigation scenario comprises at least one of:

acquiring, in response to the navigation scenario being the navigation beginning scenario, an entrance animation of the virtual navigator;

acquiring, in response to the navigation scenario being the straight travel scenario, a forward travel animation of the virtual navigator;

acquiring, in response to the navigation scenario being the scenario of reaching the turning point position in the navigation route, a turning point guidance animation of the virtual navigator;

or acquiring, in response to the navigation scenario being the navigation ending scenario, an exit animation of the virtual navigator.

* * * * *